US011777439B2

(12) United States Patent
Thomas et al.

(10) Patent No.: US 11,777,439 B2
(45) Date of Patent: Oct. 3, 2023

(54) COMPACT, LIGHTWEIGHT, PORTABLE TRAILER WITH SOLAR TOWER AND AUTONOMOUS HYBRID POWER SOLUTIONS

(71) Applicant: ClearView Asset Protection LLC, Hughesville, PA (US)

(72) Inventors: Lancer Thomas, Hughesville, PA (US); Kenneth Dale Sellers, Turbotville, PA (US); Jon Desantis, Montgomery, PA (US)

(73) Assignee: ClearView Asset Protection LLC, Hughesville, PA (US)

( * ) Notice: Subject to any disclaimer, the term of this patent is extended or adjusted under 35 U.S.C. 154(b) by 0 days.

(21) Appl. No.: 17/201,368

(22) Filed: Mar. 15, 2021

(65) Prior Publication Data
US 2021/0297035 A1  Sep. 23, 2021

Related U.S. Application Data

(60) Provisional application No. 62/989,012, filed on Mar. 13, 2020.

(51) Int. Cl.
| H02S 10/10 | (2014.01) |
| H02S 10/40 | (2014.01) |
| H02S 10/20 | (2014.01) |
| H02J 9/06 | (2006.01) |
| H02J 13/00 | (2006.01) |
| H02S 20/30 | (2014.01) |

(52) U.S. Cl.
CPC .............. *H02S 10/10* (2014.12); *H02J 9/068* (2020.01); *H02J 13/00006* (2020.01); *H02S 10/20* (2014.12); *H02S 10/40* (2014.12); *H02S 20/30* (2014.12); *H02J 2300/24* (2020.01); *H02J 2300/30* (2020.01)

(58) Field of Classification Search
CPC .......... H02S 10/10; H02S 10/20; H02S 10/40; H02S 20/30; H02J 13/00006; H02J 9/068; H02J 2300/30; H02J 2300/24
See application file for complete search history.

(56) References Cited

U.S. PATENT DOCUMENTS

| 7,193,508 B2* | 3/2007 | Hill ................. G08B 13/19632 340/431 |
| 9,006,940 B2* | 4/2015 | Korman .................. F24S 25/10 307/149 |
| 11,195,398 B1* | 12/2021 | Fu ........................... G06V 20/52 |
| 2004/0124711 A1* | 7/2004 | Muchow ................. H02S 10/12 307/64 |

(Continued)

Primary Examiner — Daniel Cavallari
(74) Attorney, Agent, or Firm — Buchanan Ingersoll & Rooney PC

(57) ABSTRACT

Embodiments related to a power platform having a mobile trailer, a tower pivotally attached to the mobile trailer, and a plurality of power sources. The plurality of power sources including at least a solar panel disposed on the tower and a fuel cell generator. The power platform also includes a housing having a transfer switching assembly and a power cord panel, wherein the transfer switching assembly is configured to receive electrical power generated from the plurality of power sources and convert the electrical power for transfer to ancillary devices via the power cord panel.

8 Claims, 7 Drawing Sheets

(56) References Cited

U.S. PATENT DOCUMENTS

| | | | |
|---|---|---|---|
| 2006/0213697 A1* | 9/2006 | Sutherland | B60K 6/46 180/2.2 |
| 2007/0285270 A1* | 12/2007 | Gunn | H02J 7/34 340/693.6 |
| 2011/0048504 A1* | 3/2011 | Kinard | H01L 31/02008 136/251 |
| 2011/0252678 A1* | 10/2011 | Jones | H02S 40/38 40/572 |
| 2013/0163976 A1* | 6/2013 | Pierce | G08B 15/001 396/427 |
| 2015/0300321 A1* | 10/2015 | Haar | F03D 13/22 206/223 |
| 2017/0141721 A1* | 5/2017 | Schmidt | H02J 3/383 |
| 2020/0248471 A1* | 8/2020 | Chambers | F21L 4/02 |

* cited by examiner

COMPACT, LIGHTWEIGHT, PORTABLE TRAILER WITH SOLAR TOWER AND AUTONOMOUS HYBRID POWER SOLUTIONS

CROSS-REFERENCE TO RELATED APPLICATIONS

This application is related to and claims the benefit of and priority to U.S. Provisional Patent Application No. 62/989,012, filed on Mar. 13, 2020, which is hereby incorporated herein by reference in its entirety.

TECHNICAL FIELD

Embodiments relate to a portable power platform configured to provide autonomous electrical power and a communications network for a geographical area that is in a remote location.

BACKGROUND

Conventional power systems are limited to stationary platforms that fail to provide any reliable means of generating electrical power autonomously for long periods of time, especially in remote areas. Conventional power systems also fail to provide any means for establishing a communications network for user devices that require to be operated in said remote area.

The disclosure presented herein is designed to overcome at least one of the technical disadvantages identified above, although not necessarily limited to embodiments that do.

SUMMARY

Embodiments relate to a rugged, compact trailer that provides for a mobile power platform with an ecofriendly autonomous fuel system in a smaller package that conventional technology cannot provide with the same, smaller footprint. The disclosed portable power platform allows for rapid deployment to operate equipment for longer periods of time in areas that were once limited to size and or power restrictions. With the ease of erection of a solar paneled tower, only one person is needed to deploy the system.

The compact ecofriendly autonomous multi fuel powered system with the ability to provide cellular and or WiFi connectivity is different in several ways from existing systems. The hybrid power solutions enables the system to operate numerous electronics in off-the-grid locations. With the ability to customize the amount of power required for operational needs, the power platform can provide support for numerous electronic systems, including but not limited to drone radar systems, radar systems, security cameras and analytics, early detection systems for fires, sensors for grid or electrical monitoring, water sensors, air quality sensors, telecommunications, satellite communications, and most electronic apparatuses. This allows equipment to be operated in remote areas with limited to no power sources.

The power platform has the ability to support small camps with communications and a limited power source. For instance, the platform can support numerous military functions or operations such as command, control, communications, computer, intelligence, surveillance and reconnaissance, etc. It is contemplated for the system to be utilized for law enforcement operations, fire department operations. Haz-Mat operations, EMA operations, military operations, at airports, at prisons, at highly regulated secured facilities, etc. Other applications can include large venues, stadiums, gas/oil industry operations, power plants, electrical grids, telecommunications, remote research areas, or anywhere where monitoring security, safety, sensors are needed.

In an exemplary embodiment, a power platform includes a mobile trailer, a tower pivotally attached to the mobile trailer, and a plurality of power sources. The plurality of power sources include a first power source comprising a solar panel disposed on the tower, and a second power source comprising a fuel cell generator. The platform includes a housing comprising a transfer switching assembly and a power cord panel, wherein the transfer switching assembly is configured to receive electrical power generated from the plurality of power sources and convert the electrical power for transfer to ancillary devices via the power cord panel.

In some embodiments, the plurality of power sources includes a third power source comprising a battery bank. The transfer switching assembly is also configured to transfer electrical power to the battery bank.

In some embodiments, the plurality of power sources includes a fourth power source comprising a plug-in assembly configured to receive electrical power from an external electrical power supply.

In some embodiments, the plurality of power sources includes a fifth power source comprising a solar panel array disposed on the housing.

In some embodiments, the battery bank includes a plurality of removable batteries.

In some embodiments, the platform includes a communications interface configured to establish a communication network.

In some embodiments, the platform includes a control module in operative association with the transfer switching assembly, the control module configured to perform power system management for the plurality of power sources.

In some embodiments, the platform includes a control module in operative association with the transfer switching assembly and the communications interface, the control module configured to perform power system management for the plurality of power sources and network topology management for nodes included in the communication network.

In some embodiments, the platform includes a surveillance system.

In some embodiments, the mobile trailer is constructed of metal and the tower is constructed of reinforced polymer composite.

In some embodiments, the tower is a cylindrical object having a hollow interior.

In some embodiments, electrical wiring and electrical components electrically connecting the first power source and the transfer switching assembly are routed within the hollow interior of the tower.

In some embodiments, the solar panel comprises a flexible solar panel array that is wrapped about a circumference of the tower.

In some embodiments, the first power source comprises a plurality of solar panels.

In some embodiments, the solar panel array disposed on the housing is a flat panel.

In some embodiments, batteries of the battery bank are Absorbent Glass Mat (AGM) batteries or lithium batteries.

In some embodiments, the fuel cell generator is a methanol fuel cell generator.

In some embodiments, the platform includes an electric winch system to raise and lower the tower.

In some embodiments, the platform includes a tow hitch assembly and a removable tongue configured to insert into the tow hitch assembly.

In some embodiments, the platform includes a cradle configured to support the tower when in a lowered position.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
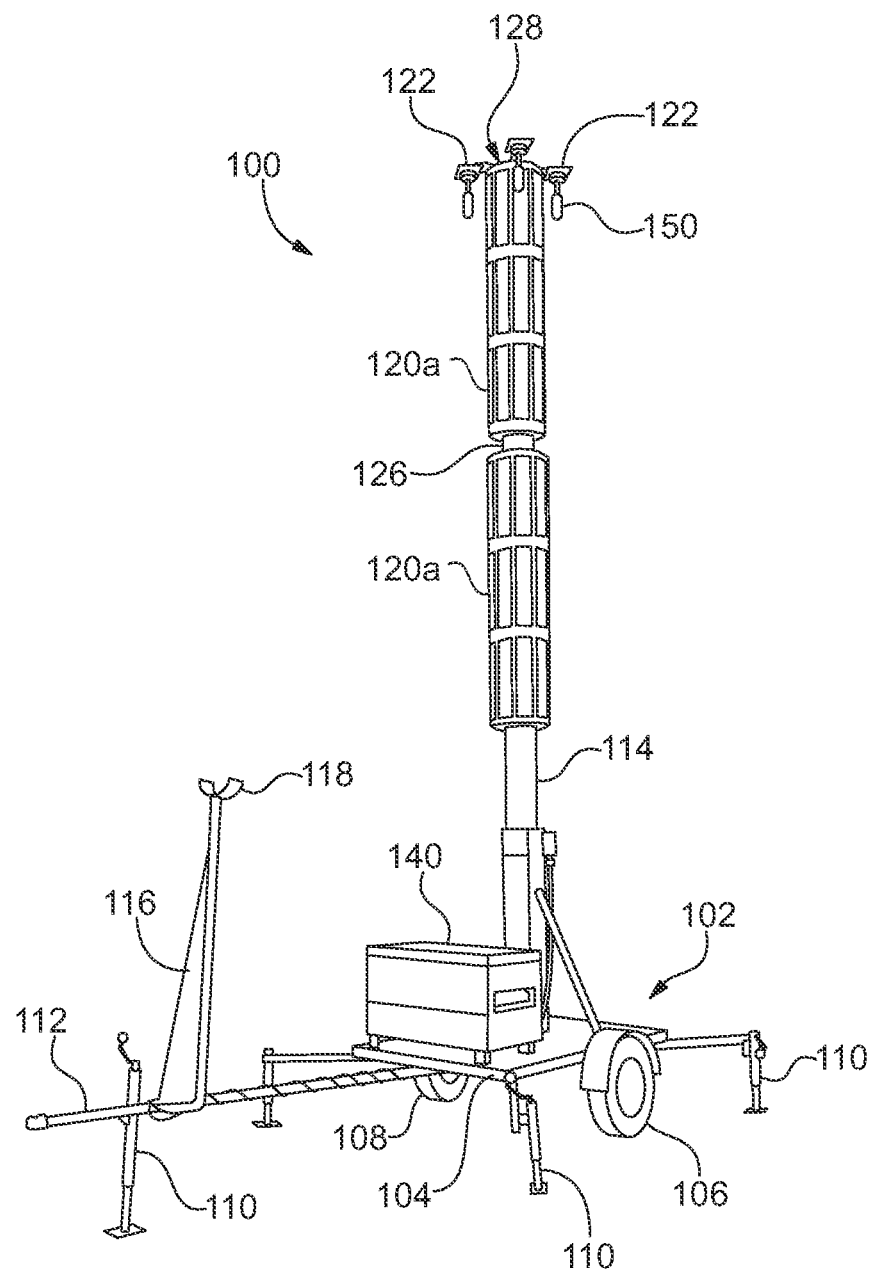
FIG. 1 shows an exemplary power platform configuration in an erected position.
Figure 2:
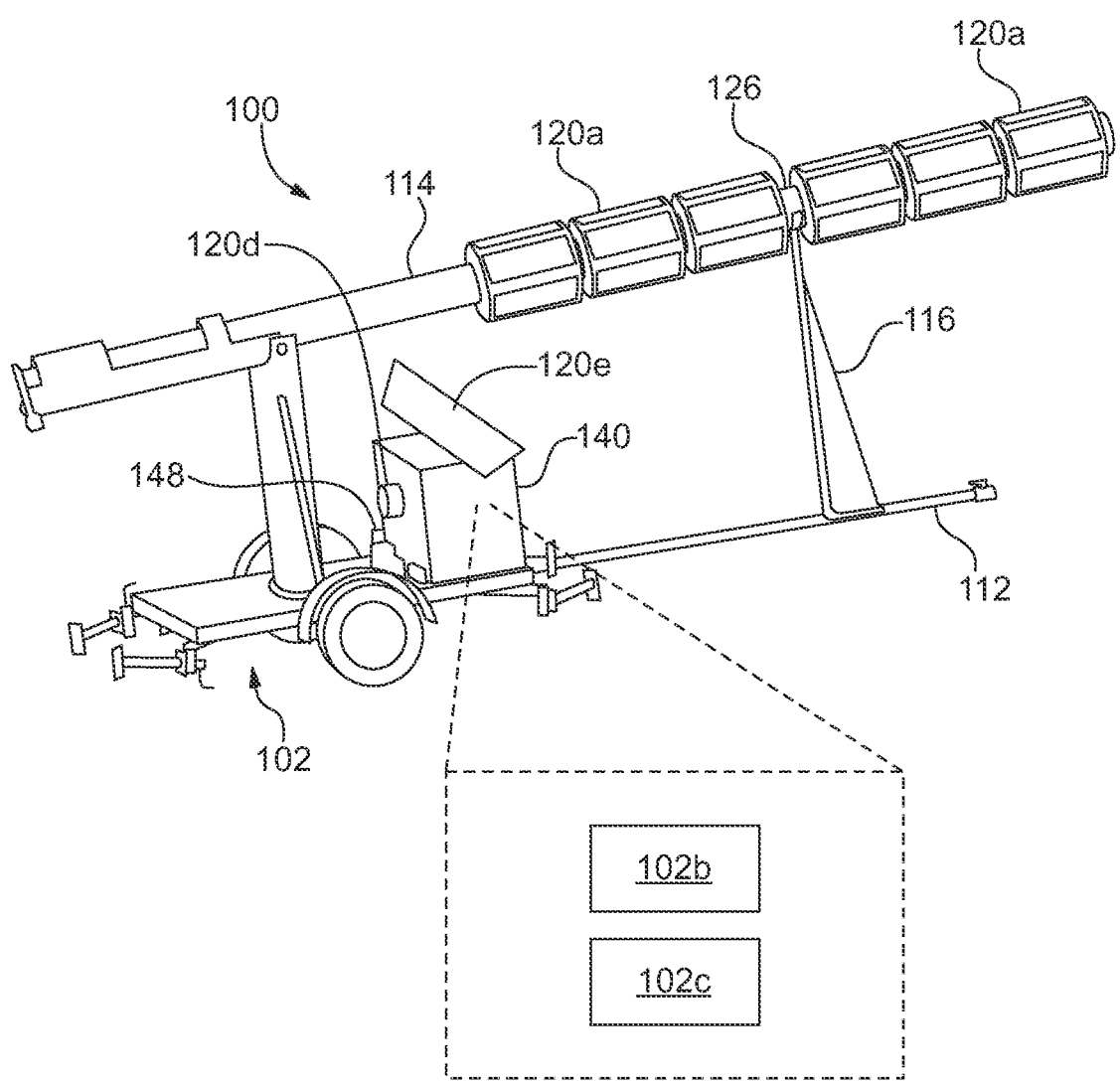
FIG. 2 shows an exemplary power platform configuration in a non-erected position.

Referring to FIGS. 1-2, embodiments relate to a power platform 100 configured to provide, inter alia, autonomous electrical power to a plurality of devise and/or systems. Embodiments of the power platform 100 can be portable. The power platform 100 can provide hybrid power solutions for devices and/or systems, such as any one or combination of satellite systems, RADAR, WiFi, security cameras, supervisory control and data acquisition (SCADA), drone detection systems, laptop computers, desktop computers, etc. It is contemplated for the power platform 100 to be used in remote locations (e.g., remote from traditional, conventional, or reliable sources of electrical power) to provide electrical power for devices and systems in those remote locations. The power platform 100 is designed to be rugged and operationally stable so as to be able to operate reliably even in inclement weather conditions (e.g., extreme weather, very dry or wet climates, very hot or cold climates, etc.). For example, the power platform 100 can be transported to a remote location (e.g., an undeveloped area, underdeveloped area, etc.) that has little or no reliable electrical power supply, local communication network, etc. The power platform 100 can be used to provide electrical power, communication interfaces, etc. to a geographical area within the remote location so as to allow other devices, such as a laptop a computer, a cellular phone, a satellite antenna, RADAR, flood lights, purifiers, etc. to operate. For instance, a police force, military force, HAZMAT unit, etc. may be deployed to such remote location and desire to set up a command post to coordinate activities. The power platform 100 can facilitate such operations.

The power platform 100 can include a trailer 102. The trailer 102 is a support structure that supports the other components of the power platform 100. The support structure can be a flatbed 104, for example. The flatbed 104 can have wheels 106, a tow hitch assembly 108, and outriggers 110. The flatbed 104 can have any dimensions, but preferred dimensions are eighty-seven inches wide by eighty-three inches long. The tow hitch assembly 108 can include a removable tongue 112 to allow for extended out-board support via an additional outrigger 110. The removable tongue 112 is a cylindrical pole or bar that inserts within a receiving end of the tow hitch assembly 108. The removable tongue 112 extends outward in a cantilever fashion. An additional outrigger 110 is attached to a portion of the removable tongue 112. As will be explained herein, a majority of the heavy components and the tower 114 (when in a lowered position) is located at or near the trailer's tow hitch end. Thus, the removable tongue 112 and additional outrigger 110 provide support for such weight. For instance, the removable tongue 112 and additional outrigger 110 would prevent the platform 100 from tipping over or being unstable.

The removable tongue 112 also includes a cradle 116. The cradle 116 is a stand that supports the tower 114 when the tower 114 is lowered to a non-erect position. The cradle 116 can be a tri-pod like structure with a crescent shaped handle 118. When the tower 114 is lowered to a non-erect position, it rests within the handle 118.

The flatbed 104, outrigger 110, tongue 112, and cradle 116 can be made from lightweight, rigid material such as metal (e.g., steel, aluminum, etc.), polymer material, etc. It is contemplated for the trailer 102 to weigh approximately 1,400 pounds without the other components (e.g., tower 114, power sources 120, communication interfaces 122, etc.). It is further contemplated for the power platform 100 with the other components to weight approximately 2,200 pounds. This maximum weight of approximately 2,200 pounds allows non-heavy duty vehicles, such as pick-up trucks or Sport Utility Vehicles, to transport the power platform 100.

The tower 114 is pivotally connected to the flatbed 104 portion of the trailer 102, allowing the tower 114 to be raised to an erect positon and lowered to a non-erect position. This can be done manually, via a pulley system, a hydraulic system, an electric winch system etc. When placed in the erect position, the tower 114 can be secured in that erect positon via securement means, such as tie-downs, clamps, straps, cotter-pin assembly, bolt or latch assembly, spring-loaded pin and detent assembly, etc.

It is contemplated for the tower 114 to be a hollow structure—e.g., a cylindrical structure with a hollow interior. The tower 114 can be made from light weight, rigid material, such as reinforced polymer composite. The hollow interior provides for a light weight construction and allows for placement and routing of wiring, certain electrical and communication components, and other sensitive components therein so as to be concealed inside the hollow interior. This can minimize theft, tampering, and vandalisms, as well as reduce product deterioration due to weather, animal, and rodent exposure, etc. The tower 114 can be any length, but a preferred length is twenty three feet long. At twenty three feet long, the tower 114 weighs approximately 120 pounds and can withstand 160 mph winds.

The tower 114 has at least one solar panel 120a attached thereto. The solar panel 120a can be a flexible solar panel or a rigid solar panel. It is contemplated for the solar panel 120a to be wrapped about a circumference of the tower 114. In some embodiments, the solar panel 120a is wrapped about the entire circumference of the tower 114. This can provide 360-degree access to sunlight. A plurality of solar panels 120a can be disposed on the tower 114 so as to cover a length of the tower 114. As noted herein, the tower 114 is supported by a cradle 116 when in a non-erect position. To accommodate this, the solar panels 120a are disposed on the tower 114 so as to leave a gap 126 in solar panel 120a coverage at a predetermined location of the tower 114, the gap 126 being a portion that exposed the tower 114. When in a non-erect position, the tower 114 is lowered so that the exposed tower portion at the gap 126 makes contact with the cradle 116. Securement means, such as tie-downs, clamps, straps, cotter-pin assembly, bolt or latch assembly, spring-loaded pin and detent assembly, etc. can be used to further secure the tower in the non-erect position.

Figure 3:
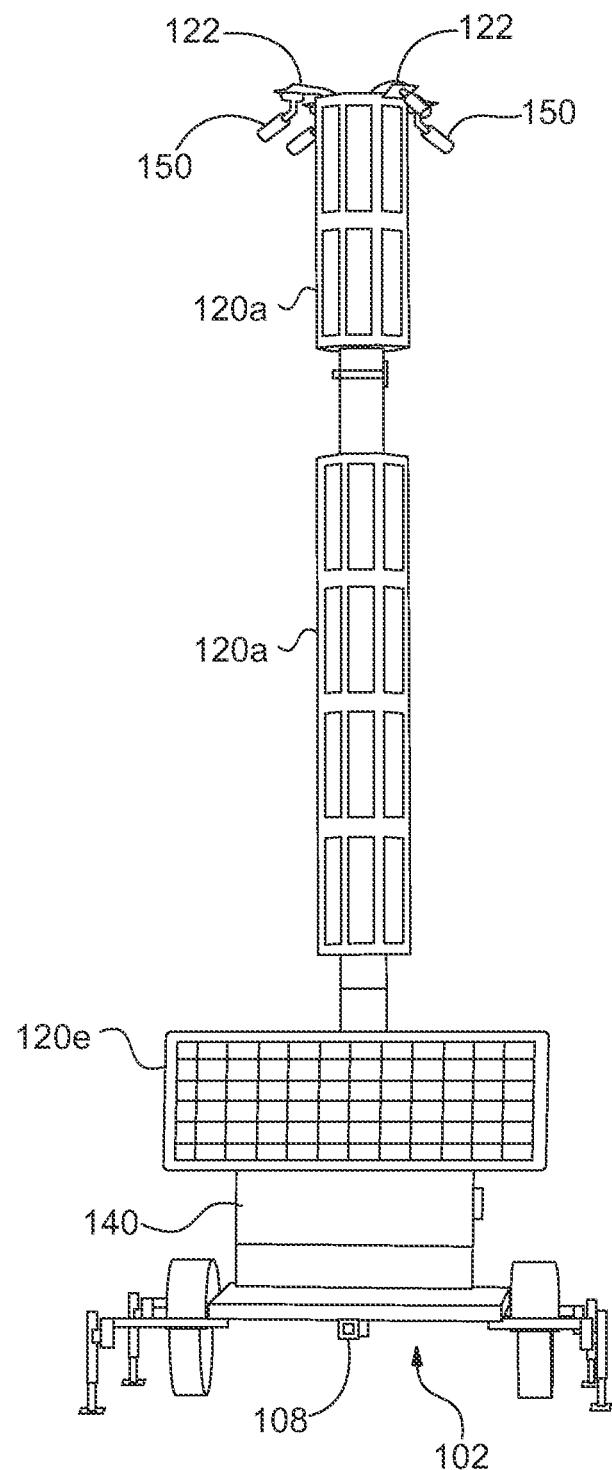
FIG. 3 shows another exemplary power platform configuration in an erected position.

Referring to FIG. 3, in some embodiment, the tower 114 can have a communications interface 122. The communications interface 122 can be disposed at a distal end 128 of the tower 114 or placed at a remote location from the platform 100, provided it can be placed in electrical connection with the electrical power supply from the platform 100. The communications interface 122 can be any one or combination of communication devices (antennas, transceivers, modems, routers, gateways, etc.) configured to receive and broadcast communication signals, establish communication networks, establish local antenna networks, establish distributed antenna networks, establish a local area network, establish a satellite communication network, establish a cellular network (e.g., 3G, 4G, 5G, LTE, as well as multiple carriers), etc. The communications interface 122 can establish communication protocols to allow/deny access to the network it establishes, direct and discriminate signal transmissions, establish WiFi, etc. The communications protocol also defines the rules, syntax, semantics, and synchronization of communication between devices within the network it establishes. The communications interface 122 can allow the power platform 100 to serve as an antenna node for the network, a common communication source for other nodes (other devices that join the network) on the network, a repeater to facilitate communication between two networks, a Beyond Line of Site (BLOS) node, etc. When other nodes (e.g., other devices at the site for which the power platform 100 is providing electrical power and communications) are added to the network, the network topology can be a master-slave topology, a peer-to-peer topology, a distributed node architecture, etc.

Figure 4:
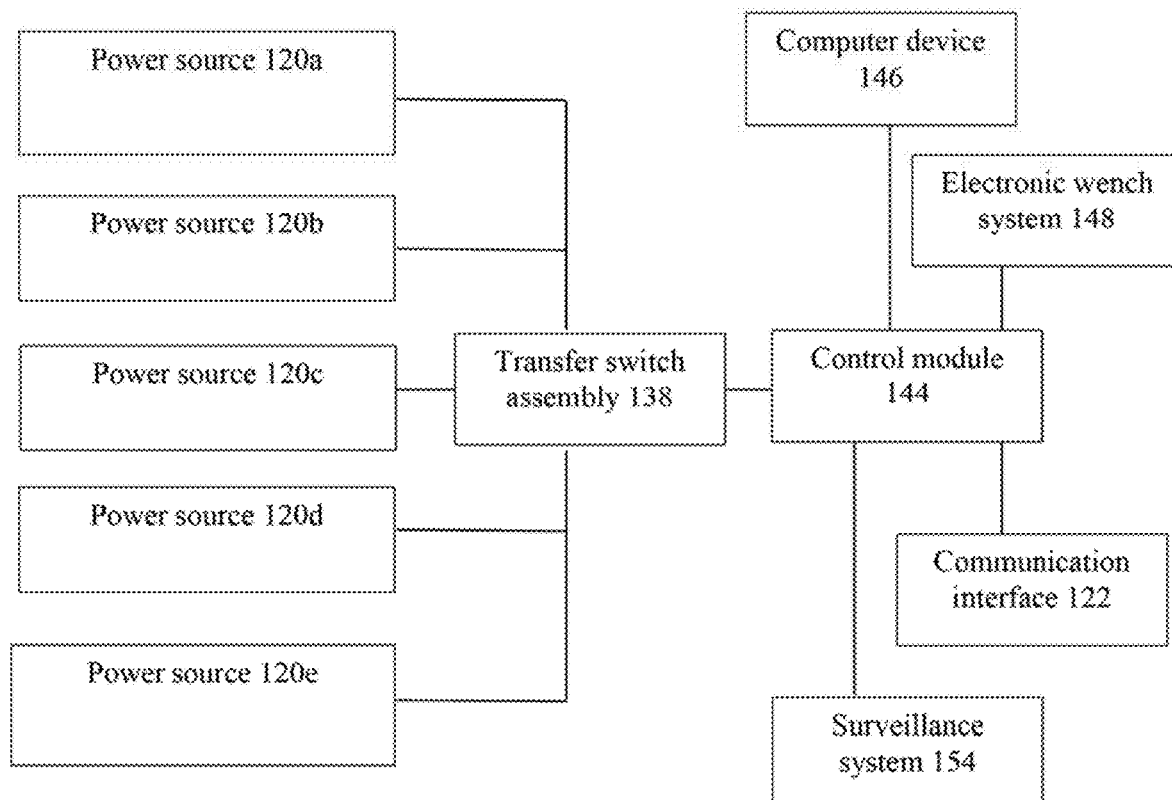
FIG. 4 shows a block diagram of an exemplary system architecture configuration for an embodiment of the power platform.
Figure 5:
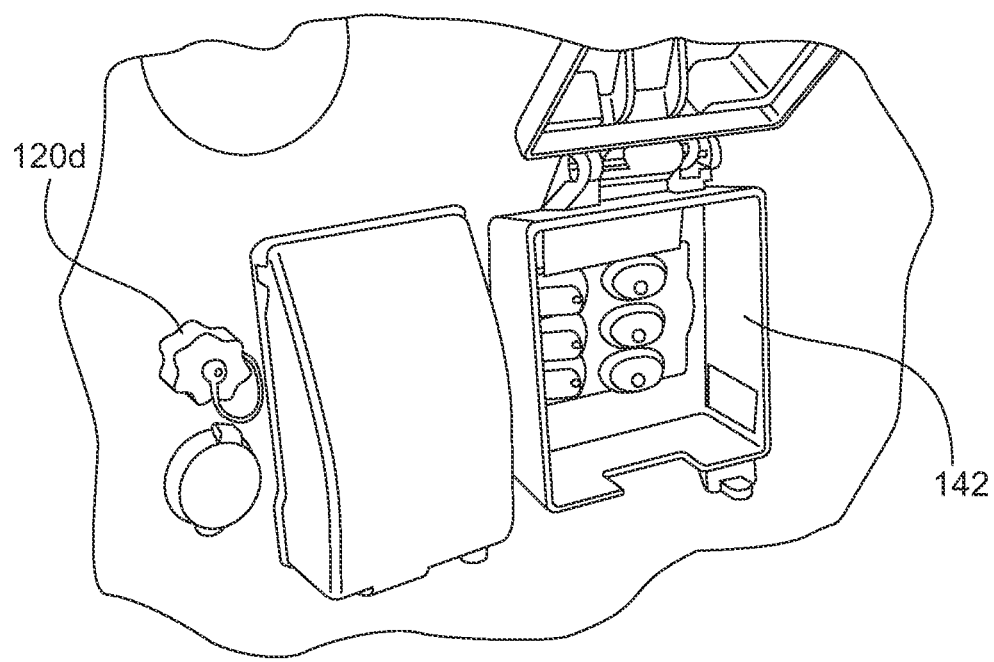
FIG. 5 shows an exemplary plug-in assembly for the power platform.

Referring to FIGS. 4-5, the power platform 100 includes at least one power source 120. The first power source 120a was described above—the solar panels 120a disposed on the tower 114. A second power source 120b is a fuel cell generator. A third power source 120c is a removable battery bank. A fourth power source 120d is a plug-in assembly that allows the power platform 100 to draw electrical power from an external electrical power supply (e.g., a wall outlet, emergency generator, etc.). A fifth power source 120e is a flat solar panel array. Each power source 120 is in electrical connection with a transfer switching assembly 138. The transfer switching assembly 138 includes switches, transformers, AC-DC and DC-AC converters, etc. that allows for coordinated receipt and dissemination of electrical power.

The transfer switching assembly 138 can be housed within a housing 140 (or a secured equipment box) on the flatbed 104 portion of the trailer 102. The transfer switching assembly 138 is configured to receive electrical current/voltage from any one or combination of the power sources 120 and convert the current/voltage to a desired form to operate or power other devices. The conversion can be to facilitate transfer of electrical power to the communications interface 122. The conversion can be to facilitate transfer of electrical power to a power cord panel 142 so as to allow plugging devices (e.g., laptops, cameras, lights, etc.) into the power cord panel 142 and permit them to receive electrical power therefrom. The conversion can be to facilitate transfer of electrical power to the battery bank so as to charge the batteries therein. The conversion can be to facilitate transfer of electrical power from the battery bank so as to draw electrical power therefrom.

The power platform 100 also has a control module 144 (e.g., a processor) that controls the transfer switching assembly 138 and the communications interface 122. The control module 144 includes software, firmware, sensing modules, etc. for power system management. For instance, the control module 144 can determine that the batteries in the battery bank are low and that excess power is being generated by any one or combination of the other power sources 120. In this scenario, the control module 144 can cause the transfer switching assembly 138 to route excess power to the battery bank. As another example, the control module 144 can determine that power demand is high, and begin to draw electrical power from the battery bank to supplement power being generated by the other power sources 120. The control module 144 can determine which power-drawing activities are essential and which are non-essential (e.g., which devices drawing power are essential and which are not, based on the task at hand). If power demand is high and there is no other means to generate extra power, the control module 144 can cut off or limit power transfer to non-essential devices. As another example, the control module 144 can limit communication range or signal strength when devices are determined to be within a limited geographical area, when communication traffic is low, etc.

The control module 144 can be controlled via a user interface of a display. The power platform 100 itself can include a display for the user interface. In addition, or in the alternative, a computer device 146 included into the network established by the communications interface 122 can have a display for the user interface. The user interface allows a user to control various operational aspects of the control module 144, identify essential and non-essential devices of the network, set up communication protocols, add or remove devices to/from the network, activate or de-activate power sources 120, etc. The user interface can also allow a user to set up protocols by which the control module 144 will follow to execute power management.

The first power source 120a is the solar panel(s) disposed on the tower 114. Electrical connections and wiring can be routed from the first power source 120a to the transfer switching assembly 138 via the hollow interior of the tower 114. In addition, the electrical connections and wiring to the communications interface 122 (if it is disposed on the tower 114) from the transfer switching assembly 138 is also routed via the hollow interior of the tower 114. It is contemplated for the first power source 120a to include six solar wrap-around panels, the combined output being 300 watts (e.g., 50 watts per solar panel). The solar panels can be military grade solar panels.

The second power source 120*b* is the fuel cell generator. The fuel cell generator is an eco-friendly, smart, methanol fuel cell generator configured to convert methanol into electricity through a single stage catalytic conversion process. This can be capable of generating 110 watts. The second power source 120*b* can be housed within the housing 140 and include electrical connections to facilitate electrical connection between the second power source 120*b* and the transfer switching assembly 138.

The third power source 120*c* is the battery bank. The battery bank can include at least one battery (e.g., Absorbent Glass Mat (AGM) battery, lithium battery, etc.). The battery bank can also be housed within the housing 140. Electrical connections facilitate electrical connection between the third power source 120*c* and the transfer switching assembly 138. Any one or combination of the batteries can be removed. Each battery has terminals to allow it to be transported to a different location (a location different from the power platform 100) to either be charged or have electrical power drawn therefrom.

The fourth power source 120*d* is a plug-in assembly. The plug-in assembly is a standard 120-V and/or 220-V plug inlet(s) to facilitate drawing electrical power from an external electrical power supply (e.g., a wall outlet, emergency generator, etc.). The fourth power source 120*d* can be part of the power cord panel 142. As noted above, the power cord panel 142 can be a standard plug socket array (e.g., two- or three-prong plug-ins), allowing other devices to be plugged into the power platform 100. The power cord panel 142 can also include USB ports, HDMI ports, and other type of electrical power connections. Electrical connections facilitate electrical connection between the fourth power source 120*d* and the transfer switching assembly 138. If the fourth power source 120*d* is not part of the power cord panel 142, additional electrical connections are provided to facilitate electrical connection between the power cord panel 142 and the transfer switching assembly 138.

The fifth power source 120*e* is the flat solar panel array. The flat solar panel 120*a* can be mounted on the housing 140. The housing 140 can include electrical connections to facilitate electrical connection between the fifth power source 120*e* and the transfer switching assembly 138. It is contemplated for the fifth power source 120*e* to be able to generate 600 watts. The combined output of the first and second power source, 120*a* 120*b* can be 900 watts.

The first, second, and fifth power sources 120*a*, 120*b*, and 120*e* can be used in conjunction to provide 2.5 Kilowatts of output and maintain the batteries of the battery bank (e.g., the third power source 120*c*) for up to twelve months or more.

As noted herein, embodiments of the power platform 100 can include an electric winch system 148 to operate the raising and lowering of the tower 114. With this embodiment, electrical connections are further provided to facilitate electrical connection between the electric winch system 148 and the transfer switching assembly 138.

Figure 6:
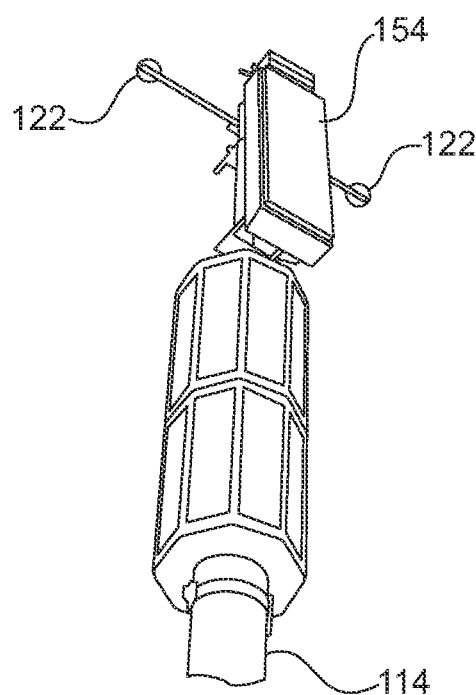
FIG. 6 shows an exemplary surveillance system component for the power platform.
Figure 7:
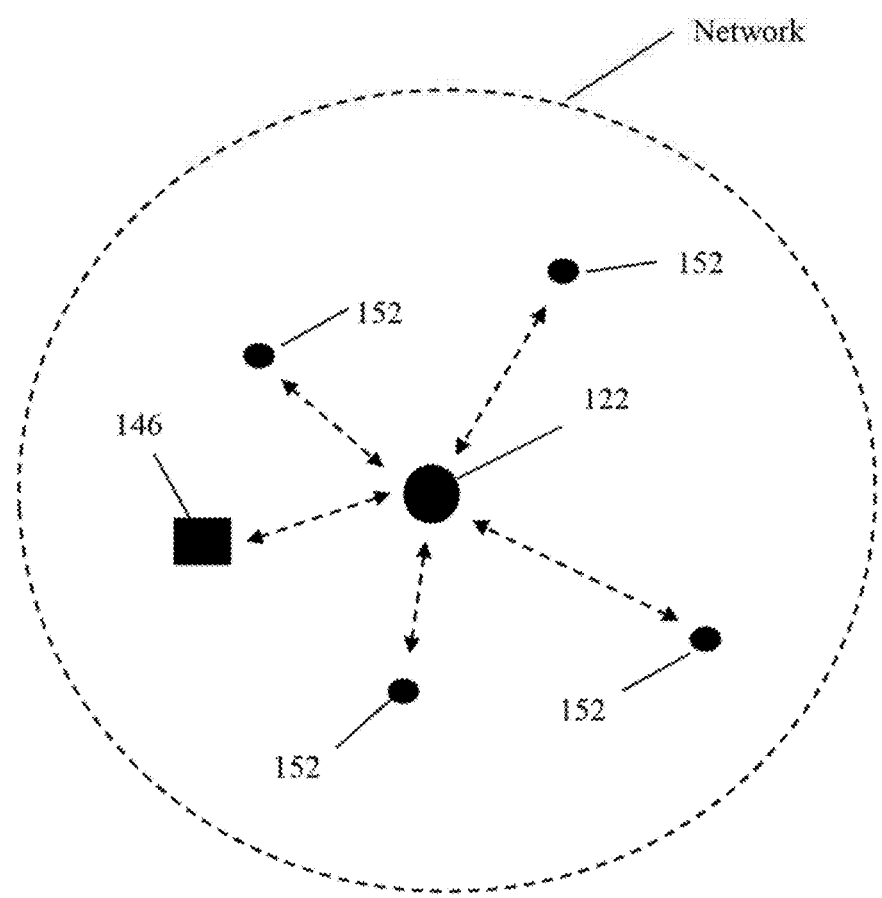
FIG. 7 shows an exemplary system configuration that integrates devices as part of the surveillance system via the communications interface.

Referring to FIGS. 6-7, the power platform 100 is designed to be maintenance free, or at least require minimal maintenance. Besides attending to normal wear and tear, the power platform 100 is a ready-to-use system. The platform 100 can be transported to a site and quickly begin providing electrical power to multiple devices. Simply raising the tower 114 can allow for providing a communications network in addition to electrical power. Just as easily, the tower 114 can be lowered and the platform 100 transported to another location for repeated use. In addition, some embodiments include a surveillance system 154. An exemplary surveillance system 154 can be a camera 150 (visible light, IR light, auto-tracker, pan-tilt-zoom, thermal imaging, etc.). Additional surveillance system 154 components can include sensors (motion, heat, noise, etc.) and analytics software (operated by the control module 144) to detect motion, generate alert notifications, identify and capture license plates of vehicles, identify and capture facial features, identify certain types of noise (e.g., gun shots), etc. The alert notifications can be routed to any one or combination of the nodes established on the network. Components of the surveillance system 154 (e.g., cameras 150, sensors, etc.) can be placed on the platform 100 (e.g., at the distal end 128 of the tower 100) or at locations remote from the platform 100 but within the network established by the platform 100). The surveillance system 154 can allow for remote monitoring of the power platform 100 by a user device that is included within the network established by the platform 100. This further assists with maintenance free operations.

Referring to FIG. 7, the communications interface 122 can be used to integrate other devices 152 into the surveillance system 154. For instance, sensors, helmet cams, RADAR, LIDAR, and other devices 152 can be included into the network as a node. The devices 152 can be smart devices so as to allow them to communicate with the computer device 146 and/or be controlled by the computer device 146. For instance, any one or combination of the devices 152 can include and Application Programming Interface (API) that defines interactions between multiple software or mixed hardware-software intermediaries so as to ensure interoperability. A user of the computer device 146 can then communicate with or control aspects of the devices 152. For instance, security personnel can wear head gear that include helmet cams. These helmet cans can be devices 152 included into the network as nodes. A user on the computer device 146 can then interact with the helmet cam to view what is being recorded and to communicate with the helmet cam. The helmet cam may have speaker and microphone capabilities so as to allow users of the helmet cam to have a conversation with users of the computer device 146. The helmet cam may be a 360-degree camera, IR camera, etc. and allow the user of the computer device 146 to view fields of view that the user of the helmet cam cannot (or should not to avoid sensory overload). In addition, user(s) of the computer device 146 can review video feeds from multiple helmet cams, system cameras 150, and other sensors (something that would be too distracting for the user of a helmet cam to view) and provide advice to security personnel regarding situational awareness. Such situation awareness can prove quite useful in law enforcement settings such as, for example, serving warrants and special operations.

An exemplary method of using the power platform 100 involves ensuring the tower 114 is in the lowered position (e.g., the non-erect position). The method involves transporting the power platform 100 to a location that would benefit from the services provided by the platform 100. This can include transporting the platform 100 to a location that has no reliable source of electrical power or communications—i.e., a forward operating area in a war zone, a remote command post for a police force, a disaster struck area, an off-site work area, a working site in a remote area having no public utilities, etc. The method involves extending the outriggers 110 to secure the trailer 102. The method involves raising the tower 114 to a raised position (e.g., the erect position). This can be done using the electric winch system 148. The electrical power to power the electrical winch system 148 can be drawing from one of the power sources 120. Devices, such as computers, laptops, RADAR devices, flood lights, etc. can be connected to the platform 100 via the power cord panel 142. The control module 144 can be used to establish a network for devices requiring communications. Such devices can include personal computers, smart devices (e.g., smart sensors, smart equipment, etc.), cellular phones, etc. Each device can operate as a node on the communications network. The control module 144 can also be used to provide power system management for each of the devices. The method can involve activating the surveillance system. Monitoring of the power platform 100 can be done via any one or combination of user devices that is included within the network as a node.

Exemplary dimensions and operational parameters for an embodiment of the power platform are provided in Table 1.

TABLE 1

| Overview | |
|---|---|
| Total weight | 2180 pounds |
| Maximum height | 26 feet (792.5 cm) |
| Minimum height | 10 feet 6 inches (320 cm) |
| Maximum operating temperature | 131° F. (55° C.) |
| Minimum operating temperature | −22° F. (−30° C.) |
| Maximum stored temperature | 140° F. (60° C.) |
| Minimum stored temperature | −22° F. (−30° C.) |
| Ground clearance | 14 inches (35.5 cm) |
| Charging System | |
| Batteries total weight | 540 pounds |
| Batteries total reserve | 48 hours |
| Batteries description | Solid cell, spill proof |
| Solar number of panels | 6 |
| Sohr watts per circular panel | Various upon location |
| Solar remotely viewable | Yes |
| Fuel cell generator maximum output voltage | 14.3 VDC |
| Fuel cell generator input | 2 methane fuel cells |
| Fuel cell generator maximum watts | 110 watts |
| Converter maximum amps | 75 amps |
| Converter maximum output voltage | 13.6 VDAC |
| Converter input | 105-135 VAC |
| Converter maximum watts | 1065 watts |
| Trailer | |
| Trailer max/min length | 11 feet 3 inches/ 9 feet 9 inches |
| Trailer max/min width | 9 feet 3 inches/ 6 feet 4 inches |
| Trailer-ground to flatbed | 2 feet |
| Electronics | |
| Electronics internet type | Cellular |
| Electronics internet provider | Verizon/AT&T |
| Electronics internet input voltage | 12 VDC |
| Electronics internet maximum watts | 9 watts |
| Electronics cell signal booster input voltage | 5 VDC |
| Electronics cell signal maximum power usage | 12 watts |
| Electronics unmanaged switch # of ports | 8 |
| Electronics unmanaged switch input voltage | 12 VDC |
| Electronics unmanaged switch maximum power usage | 4.7 watts |
| Electronics PC input voltage | 12 VDC |
| Electronics PC maximum watts | 19 watts |
| Electronics PC hard drive | 650 GB |
| Electronics PC RAM | 4 GB |
| Electronics PC viewing platform | Blue Iris/IP More Avail. |
| Secured Equipment Box | |
| Secured equipment box length | 48.25 inches (122.6 cm) |
| Secured equipment box width | 24.25 inches (61.6 cm) |
| Secured equipment box height | 28.75 inches (73.1 cm) |
| Secured equipment box pad locks | |
| Secured equipment box hide-a-key w/pin | 1 (2 keys) |

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A power platform, comprising:
    a mobile trailer;
    an elongate tower pivotally attached to the mobile trailer, the elongate tower constructed of reinforce polymer composite, the elongate tower having a hollow interior and a circumference;
    a plurality of power sources including a first power source, a second power source, a third power source, a fourth power source, and a fifth power source, wherein:
        the first power source comprises a flexible solar panel disposed on a portion of the tower about an entire circumference of the portion of the tower;
        the second power source comprises a fuel cell generator;
        the third power source comprises a battery bank;
        the fourth power source comprises a plug-in assembly configured to receive electrical power from an external electrical power supply; and
        the fifth power source comprises a solar panel array;
    a housing comprising a transfer switching assembly and a power cord panel, wherein the transfer switching assembly is configured to receive electrical power generated from the plurality of power sources and convert the electrical power for transfer to ancillary devices via the power cord panel;
    a cradle configured to support the tower when in a lowered position;
    a communications interface configured to establish a communication network; and
    a control module in operative association with the transfer switching assembly and the communications interface, the control module configured to perform power system management for the plurality of power sources and network topology management for nodes included in the communication network;
    a computer device operatively associated with the communications interface to operate on the communications network, the computer device configured to provide real time monitoring and control of the power platform from a physical location that is remote from a physical location of the power platform;
    wherein electrical wiring and electrical components electrically connecting the first power source to the transfer switching assembly are routed within the hollow interior of the tower.

2. The power platform recited in claim 1, wherein the battery bank includes a plurality of removable batteries.

3. The power platform recited in claim 2, wherein the pluralities of removable batteries of the battery bank are Absorbent Glass Mat (AGM) batteries or lithium batteries.

4. The power platform recited in claim 1, further comprising a surveillance system.

5. The power platform recited in claim 1, wherein the first power source comprises a plurality of flexible solar panels.

6. The power platform recited in claim 1, wherein the fuel cell generator is a methanol fuel cell generator.

7. The power platform recited in claim 1, further comprising an electric winch system to raise and lower the tower.

8. The power platform recited in claim 1, further comprising a tow hitch assembly and a removable tongue configured to insert into the tow hitch assembly.

* * * * *